United States Patent
Kim et al.

(10) Patent No.: US 8,079,859 B2
(45) Date of Patent: Dec. 20, 2011

(54) LAMP SOCKET FOR A BACKLIGHT ASSEMBLY

(75) Inventors: Yong-Hwi Kim, Anseong-si (KR); Hyun-Chul Bae, Cheonan-si (KR); Seong-Sik Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 181 days.

(21) Appl. No.: 12/488,419

(22) Filed: Jun. 19, 2009

(65) Prior Publication Data

US 2010/0014280 A1     Jan. 21, 2010

(30) Foreign Application Priority Data

Jul. 15, 2008   (KR) .................. 10-2008-0068624

(51) Int. Cl.
*H01R 33/02* (2006.01)
(52) U.S. Cl. ............... 439/226; 362/634; 362/217.17
(58) Field of Classification Search .............. 439/226, 439/241, 541, 375; 362/634, 217.17, 225
See application file for complete search history.

(56) References Cited

U.S. PATENT DOCUMENTS

| | | | |
|---|---|---|---|
| 7,883,231 B2 * | 2/2011 | Cho et al. ........... | 362/97.1 |
| 2009/0128734 A1 * | 5/2009 | Cho et al. ........... | 349/61 |
| 2009/0191741 A1 * | 7/2009 | Cho et al. ........... | 439/232 |
| 2010/0073908 A1 * | 3/2010 | Bae ................... | 362/97.1 |

FOREIGN PATENT DOCUMENTS

| KR | 2007-0077678 | 7/2007 |
|---|---|---|
| KR | 2007-0081261 | 8/2007 |
| KR | 2007-0098218 | 10/2007 |

\* cited by examiner

*Primary Examiner* — Vanessa Girardi
(74) *Attorney, Agent, or Firm* — Innovation Counsel LLP

(57) ABSTRACT

A first lamp electrode supporter includes a first terminal having a first lamp electrode fixing hole through which a lamp electrode is inserted, and a second terminal connected to an inverter connector. A second lamp electrode supporter is disposed opposite to the first lamp electrode supporter. The second lamp electrode supporter has a second lamp electrode fixing hole through which the lamp electrode is inserted. A peripheral portion corresponding to the second lamp electrode fixing hole is formed closely to the first lamp electrode supporter. A connecting part connects the first lamp electrode supporter and the second lamp electrode supporter. An elastic guide part is extended from the connecting part to a spacing between the first and second lamp electrode supporters. The elastic guide part supports the lamp electrode when the lamp electrode contacts the first and second lamp electrode fixing holes.

18 Claims, 8 Drawing Sheets

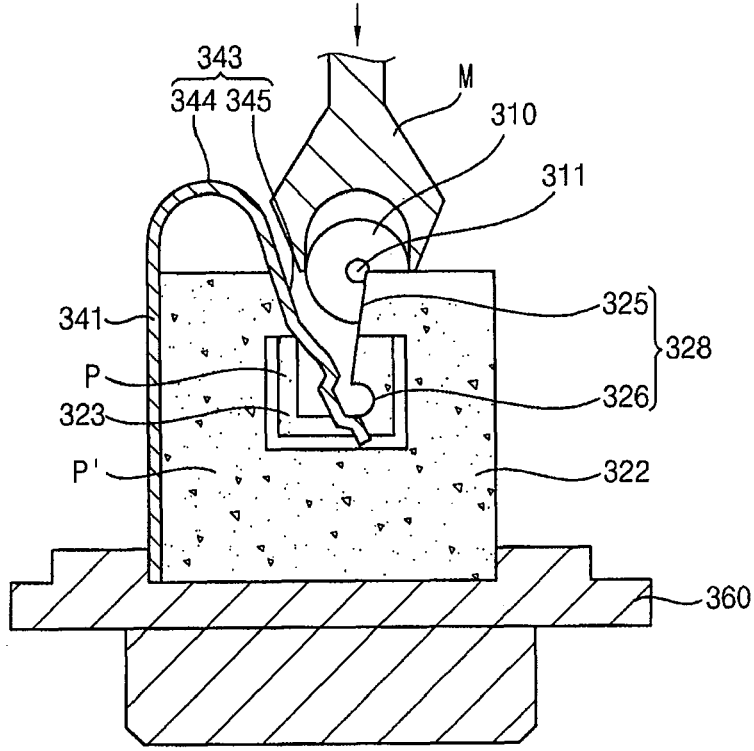
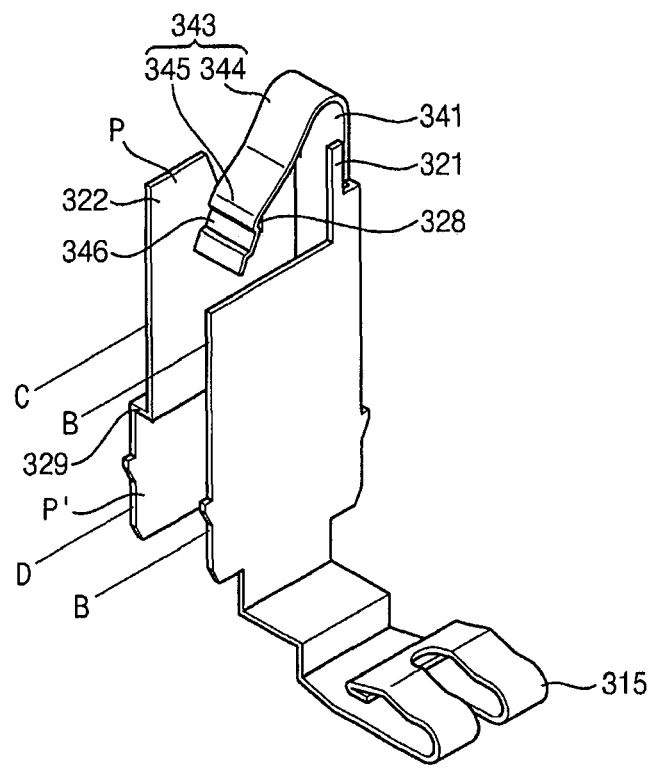

LAMP SOCKET FOR A BACKLIGHT ASSEMBLY

PRIORITY STATEMENT

This application claims priority under 35 U.S.C. §119 to Korean Patent Application No. 2008-68624, filed on Jul. 15, 2008 in the Korean Intellectual Property Office (KIPO), the contents of which are herein incorporated by reference in their entirety.

BACKGROUND

1. Technical Field

One or more embodiments of the present invention generally relate to a lamp socket, a backlight assembly having the lamp socket and a method of assembling the lamp. More particularly, one or more embodiments of the present invention relate to a lamp socket with reduced manufacturing costs and enhanced productivity, a backlight assembly having the lamp socket and a method of assembling the lamp.

2. Description of the Related Art

These days, the importance of display devices for displaying information is rising. Additionally, various types of display devices are being developed and used in various fields.

Among the various types of display devices, a flat panel display device is generally used. A representative flat panel display device is a liquid crystal display (LCD) device which displays an image by using electrical and optical features of liquid crystal. The LCD device includes an LCD panel displaying an image, a driving circuit driving the LCD panel, and a backlight unit providing light to the LCD panel.

In a conventional direct-illumination type backlight unit, a lamp with a lamp electrode is affixed to a lamp socket. However, during assembly vibrations and impacts may be generated, for example due to assembly tolerances. Thus, a lamp electrode may fall out from a lamp socket after a direct-illumination type backlight unit receives a lamp. Therefore, manufacturing costs rise in order to solve the problem of the lamp electrode falling out from the lamp socket. Additionally, the productivity of the direct-illumination backlight unit may fall, and stabilization of the assembly may not be ensured when the lamp and the lamp socket are assembled with each other.

SUMMARY

One or more embodiments of the present invention provide a lamp socket capable of preventing a lamp electrode from falling out from the lamp socket.

One or more embodiments of the present invention also provide a backlight assembly having the above-mentioned lamp socket.

One or more embodiments of the present invention also provide a method of assembling a lamp to the lamp socket.

According to an embodiment of the present invention, a lamp socket includes an inverter connector, a first lamp electrode supporter, a second lamp electrode supporter, a connecting part and an elastic guide part. The first lamp electrode supporter includes a first terminal having a first lamp electrode fixing hole through which a lamp electrode is inserted, and a second terminal being connected to the inverter connector. The second lamp electrode supporter is disposed opposite to the first lamp electrode supporter and includes a second lamp electrode fixing hole through which the lamp electrode is inserted. A peripheral portion corresponding to the second lamp electrode fixing hole is formed closely to the first lamp electrode supporter. The connecting part connects the first lamp electrode supporter and the second lamp electrode supporter. The elastic guide part is extended between the first and second lamp electrode supporters. The elastic guide part is elastically transformed when the lamp electrode is inserted into the first and second lamp electrode supporters, so that the elastic guide part supports the lamp electrode to the first and second lamp electrode fixing holes.

In accordance with an embodiment of the present invention, a concave groove may be formed through the peripheral portion corresponding to the second lamp electrode supporter toward the first lamp electrode supporter, and the second lamp electrode fixing hole may be formed through a bottom surface of the concave groove.

In accordance with an embodiment of the present invention, the peripheral portion corresponding to the second lamp electrode supporter may be disposed on an upper portion of the other portion of the second lamp electrode supporter in tiers so that a distance between the peripheral portion and the first lamp electrode supporter is smaller than a distance between the other portion and the first lamp electrode supporter.

According to an embodiment of the present invention, a backlight assembly having a lamp socket includes a bottom chassis, a lamp and a lamp socket. The bottom chassis includes a bottom plate having a socket hole formed through an edge of the bottom plate. The lamp disposed on the bottom plate includes a lamp tube and lamp electrodes disposed at ends of the lamp tube. The lamp socket includes an inverter connector, a first lamp electrode supporter, a second lamp electrode supporter, a connecting part and an elastic guide part. The inverter connector is exposed toward a rear surface of the bottom plate through the socket hole. The first lamp electrode supporter includes a first terminal having a first lamp electrode fixing hole through which a lamp electrode is inserted, and a second terminal being connected to the inverter connector. The second lamp electrode supporter is disposed opposite to the first lamp electrode supporter and includes a second lamp electrode fixing hole through which the lamp electrode is inserted. A peripheral portion corresponding to the second lamp electrode fixing hole is formed closely to the first lamp electrode supporter. The connecting part connects the first lamp electrode supporter and the second lamp electrode supporter. The elastic guide part is extended between the first and second lamp electrode supporters. The elastic guide part is elastically transformed when the lamp electrode is inserted into the first and second lamp electrode supporters, so that the elastic guide part supports the lamp electrode to the first and second lamp electrode fixing holes.

In accordance with an embodiment of the present invention, the backlight assembly may further include an inverter disposed under the bottom plate. The inverter may include a contact port electrically connected to the inverter connector.

In accordance with an embodiment of the present invention, the backlight assembly may further include a socket housing receiving the inverter connector and the first and second lamp electrode supporters. The bottom chassis may receive the socket housing.

According to an embodiment of the present invention, there is provided a method of assembling a lamp. In the method, a lamp and a lamp socket are prepared. The lamp has a lamp electrode. The lamp socket includes an inverter connector, a first lamp electrode supporter, a second lamp electrode supporter, a connecting part and an elastic guide part. The inverter connector is connected to an inverter. The first lamp electrode supporter is connected to the inverter connector and has a first lamp electrode fixing hole. The second lamp electrode supporter has a second lamp electrode fixing hole. A peripheral portion corresponding to the second lamp electrode fixing hole is formed closely to the first lamp electrode supporter. The connecting part connects the first lamp electrode supporter and the second lamp electrode supporter. The elastic guide part supports the lamp electrode. Then, the lamp electrode is inserted into the first and second lamp electrode fixing holes by pressing the elastic guide part so as to support the lamp electrode when the lamp electrode contact the first and second lamp electrode fixing holes.

In accordance with an embodiment of the present invention, the lamp electrode may be inserted into a grip part being disposed in the elastic guide part and enveloping the lamp electrode to support the lamp electrode when the lamp electrode contacts the first and second lamp electrode fixing holes.

According to one or more embodiments of the present invention of a lamp socket, a backlight assembly having the lamp socket and a method of assembling a lamp, a lamp electrode of the lamp may be strongly affixed to the lamp socket by reducing a distance between lamp electrode supporters supporting the lamp electrode. Therefore, a problem in which a lamp electrode falls out from the lamp socket may be solved.

BRIEF DESCRIPTION OF THE DRAWINGS

The above and other embodiments of the present invention will be described in detail with reference to the accompanying drawings, in which:

FIG. 8 is a cross-sectional view illustrating a method of assembling the lamp into the lamp socket of FIGS. 5 and 6 according to one or more embodiments of the present invention;

FIG. 9 is a perspective view illustrating a lamp socket according to a second embodiment of the present invention;

DETAILED DESCRIPTION

Figure 1:
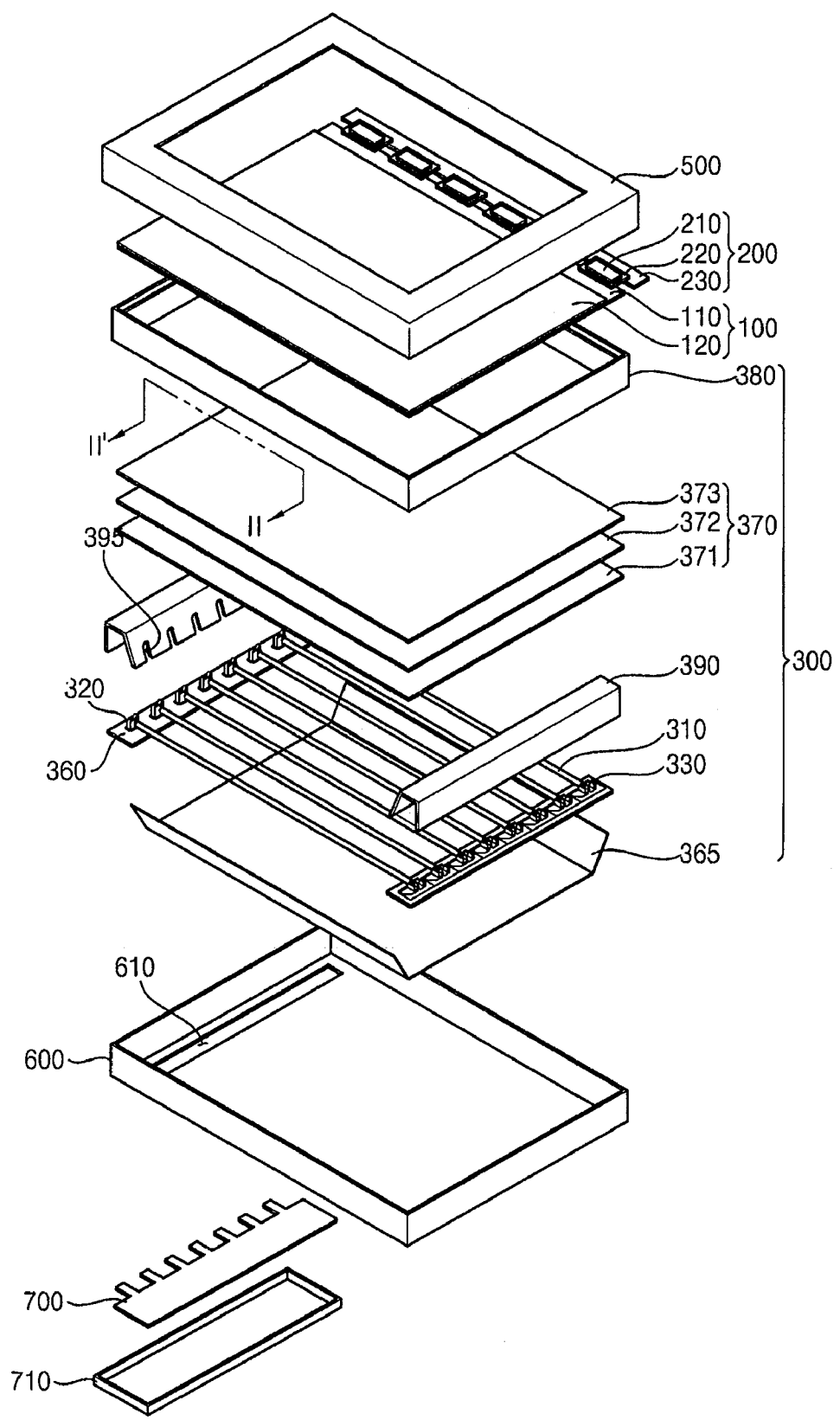
FIG. 1 is an exploded perspective view illustrating a display device according to a first embodiment of the present invention.

Embodiments of the present invention are described more fully hereinafter with reference to the accompanying drawings, in which one or more embodiments of the present invention are shown. The present invention may, however, be embodied in many different forms and should not be construed as being limited to the embodiments set forth herein. As such, the scope of the present invention will only be defined by the appended claims. In the drawings, the sizes and relative sizes of layers and regions may be exaggerated for clarity.

It will be understood that when an element or layer is referred to as being "on," "connected to" or "coupled to" another element or layer, it may be directly on, connected to or coupled to the other element or layer, or intervening elements or layers may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

It will be further understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary terms "below" or "beneath" may encompass both an orientation of above and below. The apparatus may be otherwise oriented (rotated 90 degrees or at other orientations) and the spatially relative descriptors used herein may be interpreted accordingly.

The terminology used herein is for the purpose of describing particular embodiments of the present invention only and is not intended to be limiting of other embodiments of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-sectional illustrations that are schematic illustrations of idealized embodiments (and intermediate structures) of the present invention. As such, variations from the shapes of the illustrations as a result, for example, of manufacturing techniques and/or tolerances, are to be expected. Thus, embodiments of the present invention should not be construed as being limited to the particular shapes of the regions illustrated herein, but are to include deviations in shapes that may result, for example, from manufacturing. For example, an implanted region illustrated as a rectangle will, typically, have rounded or curved features, and/or a gradient of implant concentration at its edges rather than a binary change from an implanted to a non-implanted region. Likewise, a buried region formed by implantation may result in some implantation in the region between the buried region and the surface through which the implantation takes place. Thus, the regions illustrated in the figures are schematic in nature, and their shapes are not intended to illustrate the actual shape of a region of an apparatus and are not intended to limit the scope of the present invention.

Unless otherwise defined, all terms (including technical and scientific terms) used herein have the same meaning as they are commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be explained in detail with reference to the accompanying drawings.

First Embodiment

FIG. 1 is an exploded perspective view illustrating a display device according to a first embodiment of the present invention.

Referring to FIG. 1, the display device according to the first embodiment of the present invention includes a display panel 100, a panel driver 200, a backlight assembly 300, a top chassis 500 and a bottom chassis 600.

The display panel 100 receives external light to display an image. The display panel 100 includes a first substrate 110, a second substrate 120, and a liquid crystal layer (not shown) disposed between the first and second substrates 110 and 120 and capable of controlling light transmittance between the two substrates.

The panel driver 200 drives the display panel 100 displaying the image. In order to display the image, the panel driver 200 may include a driving integrated chip 210 mounted on a signal transmission substrate 220, and a driving circuit substrate 230 providing power and signals to the display panel 100 through the signal transmission substrate 220.

The backlight assembly 300 is disposed below the display panel 100 and provides light to the display panel 100. In order to provide the light, the backlight assembly 300 may include a lamp 310, a lamp socket 320, a reflective member 365, an optical sheet 370, a mold frame 380 and a side mold 390.

Figure 4:
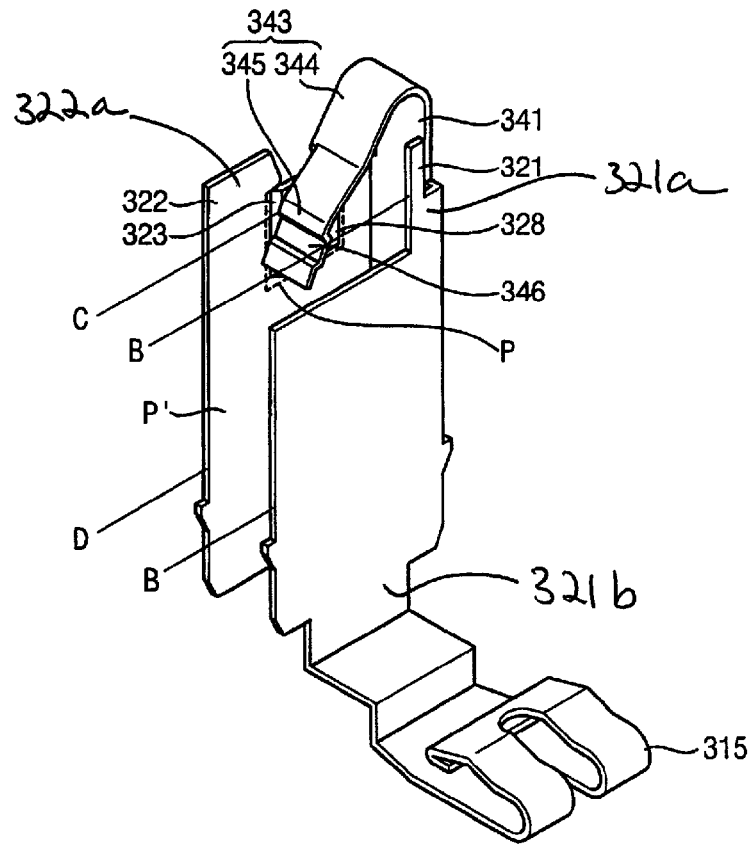
FIG. 4 is a perspective view representing the lamp socket of FIG. 3 according to one or more embodiments of the present invention.

The lamp 310 generates the light to provide the light to the display panel 100. The lamp 310 may include a lamp electrode 311, such as shown in FIG. 4, formed external to the lamp 310 to receive external power.

The lamp socket 320 disposed at one end of the lamp 310 is affixed to the lamp 310, and provides power to the lamp 310. A grounding lamp socket 330 disposed at the other end of the lamp 310 is also affixed to the lamp 310. The lamp 310 is grounded through the grounding lamp socket 330. Additionally, the lamp socket 320 may be received in the socket housing 360. The lamp socket 320 will be described later in detail with reference to FIGS. 2 and 8.

The reflective member 365 is disposed below the lamp 310, and reduces light loss by reflecting light emitted downward from the lamp 310 back toward the lamp 310. Therefore, the reflective member 365 is made from a plate or a sheet having a high reflection rate.

The optical sheet 370 includes a diffusing sheet 371, a prism sheet 372 and a protective sheet 373. The diffusing sheet 371 diffuses the light emitted from the lamp 310 to make the diffused light uniformly incident to the display panel 100. The prism sheet 372 concentrates the light diffused by the diffusing sheet 371 to make the light vertically incident onto the display panel 100. The protective sheet 373 protects the prism sheet 372 from damage such as those caused by scratches. The two or three optical sheets 370 may be selectively used according to the characteristics of the display device.

The mold frame 380 receives the display panel 100, and protects the display panel 100, the lamp 310, the lamp socket 320, the reflective member 365 and the optical sheet 370 from external impacts. Therefore, the mold frame 380 may be made from injection molding materials such as plastic.

A lamp groove 395 is formed in the side mold 390 to affix the lamp 310 by enveloping the lamp electrode 311. Additionally, the side mold 390 is formed with a fixed height to support the optical sheet 370 so that the lamp 310 and the optical sheet 370 are separated by the side mold 390. Here, the side mold 390 may have a stepped portion to receive the optical sheet 370.

The top chassis 500 is disposed on an upper portion of the display panel 100 to protect the display panel 100 and the backlight assembly 300 from external impacts. The top chassis 500 envelops an outer external edge of the display panel 100 so that a center portion corresponding to the display area of the display panel 100 is opened to expose the display area.

The bottom chassis 600 is disposed below the backlight assembly 300 to receive the backlight assembly 300. A socket hole 610 is formed in the bottom chassis 600 so that the lamp socket 320 inserts into the bottom chassis 600. Additionally, the display device according to the first embodiment of the present invention further includes an inverter 700 to provide power to the lamp 310, and a protective cover 710 to protect the inverter 700 and the lamp socket 320. The inverter 700 is disposed under the bottom chassis 600 and the inverter 700 is connected to the lamp socket 320 to provide the power to the lamp socket 320. The protective cover 710 is coupled to the bottom chassis 600 to protect the inverter 700 connected to the lamp socket 320 from external impacts. For example, the protective cover 710 may electrically and physically protect the inverter 700.

Figure 2:
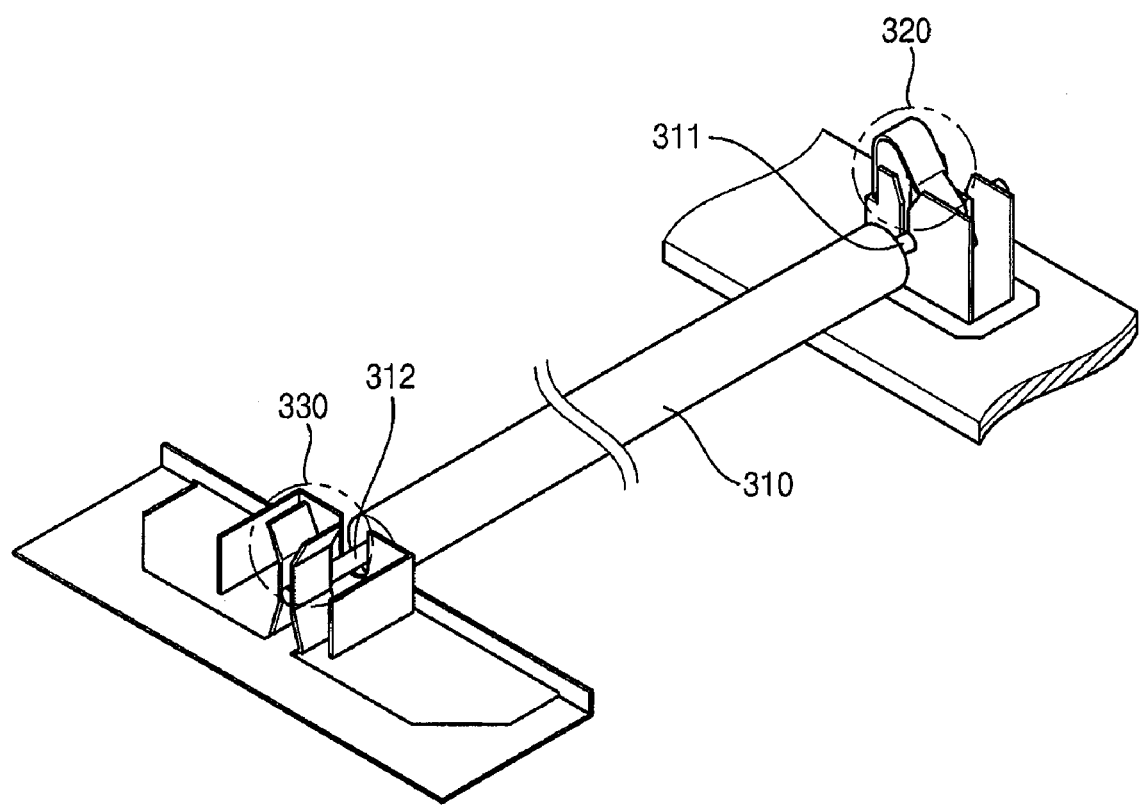
FIG. 2 is a perspective view illustrating a connection relationship among the lamp socket, the grounding lamp socket and the lamp of FIG. 1 according to one or more embodiments of the present invention.

FIG. 2 is a perspective view illustrating a connection relationship among the lamp socket 320, the grounding lamp socket 330 and the lamp 310 of FIG. 1 according to one or more embodiments of the present invention.

Referring to FIGS. 1 and 2, the lamp electrode 311 formed at one end of the lamp 310 is connected to the lamp socket 320 to receive power. A lamp grounding electrode 312 formed at the other end of the lamp 310 is connected to the grounding lamp socket 330 to be grounded. Here, the grounding lamp socket 330 contacts the bottom chassis 600 to be grounded.

Figure 3:
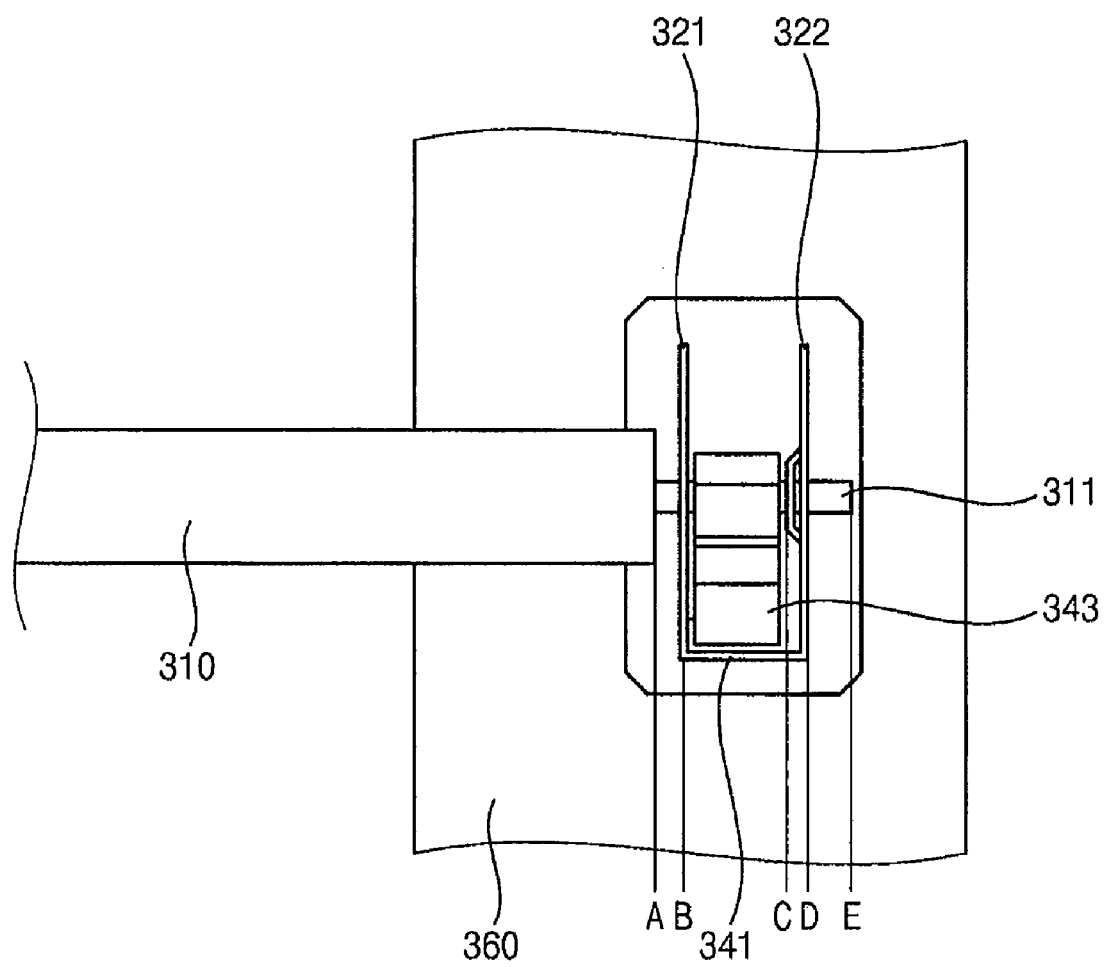
FIG. 3 is a plan view illustrating a connection relationship between the lamp socket and the lamp of FIG. 2 according to one or more embodiments of the present invention.

FIG. 3 is a plan view illustrating a connection relationship between the lamp socket 320 and the lamp 310 of FIG. 2 according to one or more embodiments of the present invention.

Referring to FIGS. 1, 2 and 3, the lamp socket 320 includes a first lamp electrode supporter 321, a second lamp electrode supporter 322, and a connecting part 341 connecting between the first and second lamp electrode supporters 321 and 322. The lamp electrode 311 of the lamp 310 is connected to the first and second lamp electrode supporters 321 and 322, and an elastic guide part 343 extending from an upper portion of the connecting part 341 to a lower side direction supports the lamp electrode 311.

Here, a first point A represents one end of the lamp 310 and one end of the lamp electrode 311, a second point B represents the first lamp electrode supporter 321, a third point C represents a connecting point between the second lamp electrode supporter 322 and the lamp electrode 311, a fourth point D represents the second lamp electrode supporter 322 excluding the connecting point, and a fifth point E represents the other end of the lamp electrode 311.

Here, a distance between the second point B and the third point C is smaller than a distance between the second point B and the fourth point D.

The socket housing 360 receiving the first and second lamp electrode supporters 321 and 322 is made of a nonmetal material.

Figure 5:
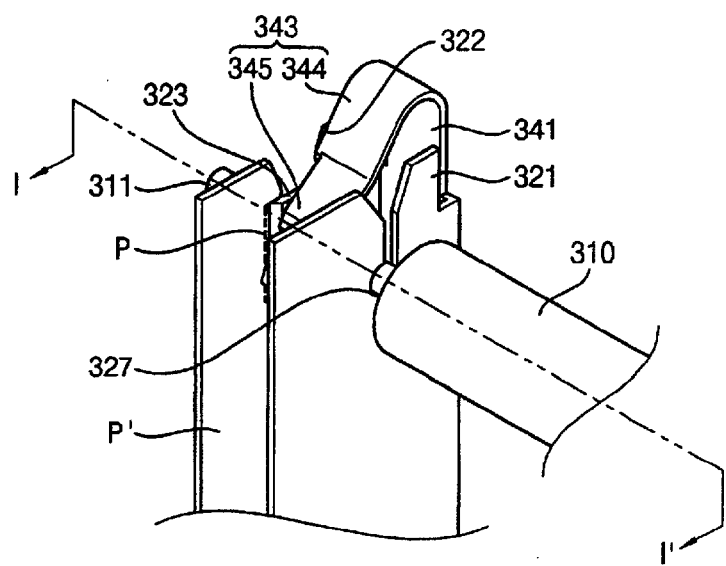
FIG. 5 is a perspective view representing the connection relationship between the lamp socket and the lamp of FIG. 3 according to one or more embodiments of the present invention.
Figure 6:
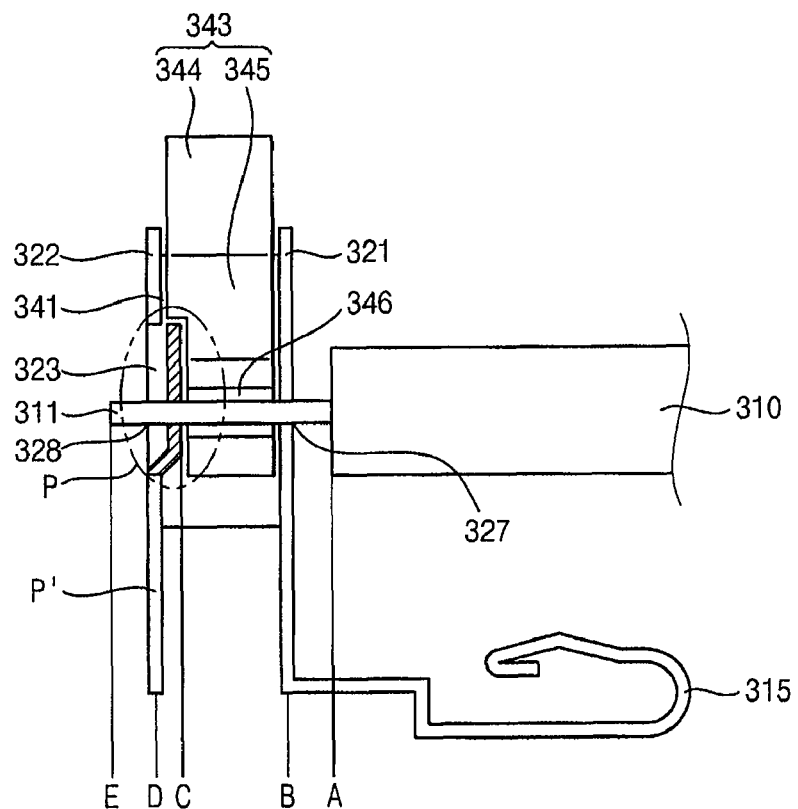
FIG. 6 is a cross-sectional view taken along a line I-I' in FIG. 5 according to one or more embodiments of the present invention.

FIG. 4 is a perspective view representing the lamp socket of FIG. 3 according to one or more embodiments of the present invention, FIG. 5 is a perspective view representing the connection relationship between the lamp socket and the lamp of FIG. 3 according to one or more embodiments of the present invention, and FIG. 6 is a cross-sectional view taken along a line I-I' in FIG. 5 according to one or more embodiments of the present invention.

Referring to FIGS. 1 and 3 to 6, the lamp socket 320 includes an inverter connector 315, the first lamp electrode supporter 321, the second lamp electrode supporter 322, the connecting part 341 and the elastic guide part 343.

The inverter connector 315 is connected to the inverter 700 to receive power from the inverter 700.

A first lamp electrode fixing hole 327 for receiving the lamp electrode 311 is formed on the first lamp electrode supporter 321 from a first terminal 321a of the first lamp electrode supporter 321, and a second terminal 321b of the first lamp electrode supporter 321 is connected to the inverter connector 315.

The second lamp electrode supporter 322 is disposed opposite to the first lamp electrode supporter 321. A second lamp electrode fixing hole 328 for receiving the lamp electrode 311 is formed on the second lamp electrode supporter 322 from a first terminal 322a of the second lamp electrode supporter 322, and a concave groove 323 is formed on a peripheral portion P of the second lamp electrode supporter 322 corresponding to the second lamp electrode fixing hole 328 and formed toward the first lamp electrode supporter 321.

As such, the distance between the second point B and the third point C is smaller than the distance between the second point B and the fourth point D due to the concave groove 323, as illustrated in FIG. 6. For example, the distance between the second point B and the third point C may be 2 mm, and the distance between the second point B and the fourth point D may be 3 mm. Therefore, the lamp electrode 311 may not fall out from the lamp socket 320.

According to the first embodiment of the present invention, the concave groove 323 is formed through the second lamp electrode supporter 322. However, a concave groove may alternatively be formed through the first lamp electrode supporter 321.

The connecting part 341 connects the first lamp electrode supporter 321 and the second lamp electrode supporter 322.

The elastic guide part 343 extends from the connecting part 341 to a spacing between the first lamp electrode supporter 321 and the second lamp electrode supporter 322. Additionally, the elastic guide part 343 guides the lamp electrode 311 to the first and second lamp electrode fixing holes 327 and 328 and helps to support the lamp electrode 311. Here, the elastic guide part 343 is elastically transformed when the first and second lamp electrode supporters 321 and 322 are receiving the lamp electrode 311.

The elastic guide part 343 includes a free end 345 for supporting the lamp electrode 311 when the lamp electrode 311 contacts the first and second lamp electrode fixing holes 327 and 328, and a fixing end 344 extending from an upper portion of the connecting part 341 in a lower side direction to be connected to the free end 345. The free end 345 may further include a grip part 346 enveloping the lamp electrode 311 to contact the lamp electrode 311. Therefore, the lamp electrode 311 is supported by the grip part 346 when the lamp electrode 311 is inserted into the first and second lamp electrode fixing holes 327 and 328.

Accordingly, the lamp electrode 311 is disposed on a groove which is concave. The lamp electrode 311 contacts the first and second lamp electrode fixing holes 327 and 328. Here, the elastic guide part 343 may need to have a sufficient thickness to exert a contact pressure of about 3.5 N when it elastically adheres to the lamp electrode 311. For example, the thickness of the elastic guide part 343 may be about 1.3 mm.

Figure 7:
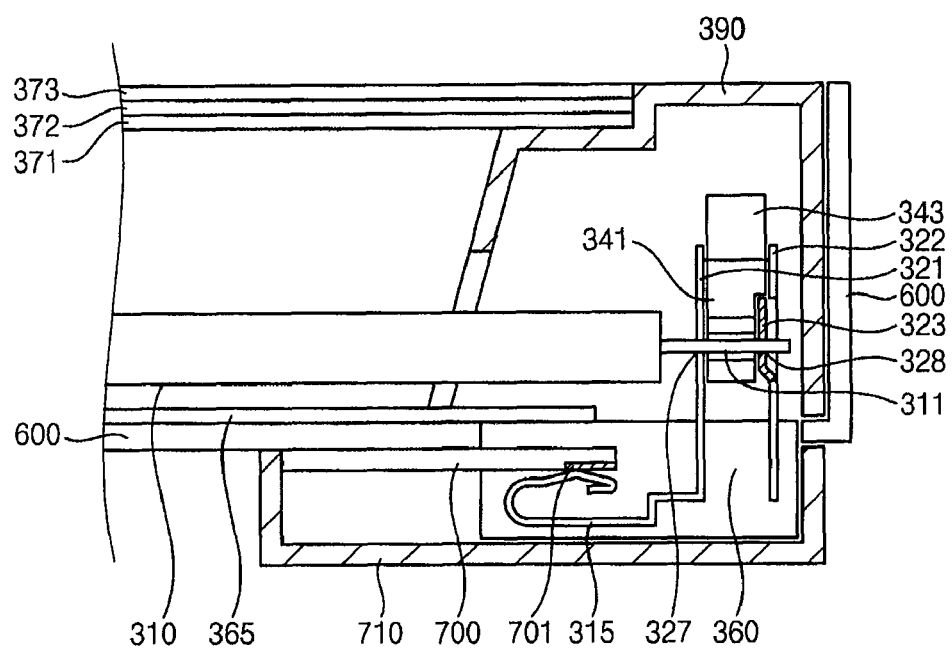
FIG. 7 is a cross-sectional view taken along a line II-II' of the display device of FIG. 1 according to one or more embodiments of the present invention.

FIG. 7 is a cross-sectional view taken along a line II-II' of the display device of FIG. 1 according to one or more embodiments of the present invention. In FIG. 7, the connection relationship between the lamp socket 320 and the lamp 310 is substantially the same as the connection relationship between the lamp socket 320 and the lamp 310 of FIG. 6.

Referring to FIGS. 1, 6 and 7, the backlight assembly 300 includes the lamp 310, the lamp socket 320, the reflective member 365, the optical sheet 370 and the side mold 390. Here, the socket housing 360 receives the lamp socket 320.

The bottom chassis 600, the inverter 700 and the protective cover 710 are disposed below the backlight assembly 300.

The socket housing 360 receives the inverter connector 315, and the first and second lamp electrode supporters 321 and 322. The bottom chassis 600 receives the socket housing 360 through the socket hole 610 formed through the bottom chassis 600.

The inverter 700 includes a contact port 701. The contact port 701 of the inverter 700 is inserted to the socket housing 360, and the inverter 700 is electrically connected to the inverter connector 315 through the contact port 701.

The protective cover 710 is disposed to envelop the inverter 700 and the socket housing 360.

FIG. 8 is a cross-sectional view illustrating a method of assembling the lamp into the lamp socket of FIGS. 5 and 6 according to one or more embodiments of the present invention. In FIG. 8, the connection relationship between the lamp socket 320 and the lamp 310 is substantially the same as the connection relationship between the lamp socket 320 and the lamp 310 of FIG. 6. Thus, corresponding reference numbers are used for corresponding elements and identical descriptions are omitted.

Referring to FIGS. 5, 6 and 8, the lamp 310 and the lamp socket 320 are assembled by an automatic system.

The lamp 310 having the lamp electrode 311, and the lamp socket 320 are prepared. The lamp socket 320 includes the inverter connector 315, the first and second lamp electrode supporters 321 and 322, the connecting part 341 and the elastic guide part 343. The inverter connector 315 is connected to the inverter 700. The first and second lamp electrode supporters 321 and 322 have the first and second lamp electrode fixing holes 327 and 328. The connecting part 341 connects the first and second lamp electrode supporters 321 and 322. The elastic guide part 343 supports the lamp electrode 311.

Then, an automatic machine M moves the lamp 310 to a designated location of the lamp socket 320 and presses the elastic guide part 343 so that the lamp electrode 311 is inserted into the first and second lamp electrode fixing holes 327 and 328. Therefore, the elastic guide part 343 is elastically transformed.

Here, the first and second lamp electrode fixing holes 327 and 328 include a first insertion guide part (not shown) and a second insertion guide part 325 respectively, where the widths of the insertion guide parts are gradually reduced from first terminals to second terminals of the first and second lamp electrode supporters 321 and 322. The first and second lamp electrode fixing holes 327 and 328 also include a first supporting groove (not shown) and a second supporting groove 326 respectively, where the shape of the supporting grooves correspond to the shape of the lamp electrode 311. The lamp electrode 311 is guided toward the second terminal 322b of the second lamp electrode supporter 322 through the second insertion guide part 325 and the lamp electrode 311 is inserted into the second supporting groove 326 when the elastic guide part 343 is pressed.

Then, the lamp electrode 311 is supported by and makes contact with the first and second lamp electrode fixing holes 327 and 328. The lamp electrode 311 may closely adhere to the first and second lamp electrode fixing holes 327 and 328 due to the elastic guide part 343 exerting elastic force against the lamp electrode 311.

Here, a distance between the first and second lamp electrode supporters 321 and 322 is sufficiently smaller than the length of the lamp electrode 311 due to the concave groove 323. Thus, the lamp electrode 311 may not fall out from the lamp socket 320 when the lamp electrode 311 is inserted into and contacts the lamp socket 320.

Second Embodiment

FIG. 9 is a perspective view illustrating a lamp socket according to a second embodiment of the present invention. In FIG. 9, the lamp socket is substantially the same as the lamp socket in FIG. 4, except that a peripheral portion P corresponding to the second lamp electrode supporter 322 is connected to the other portion P' of the second lamp electrode supporter 322 in tiers. Thus, corresponding reference numbers are used for corresponding elements and identical descriptions are omitted.

Referring to FIG. 9, the peripheral portion P corresponding to the second lamp electrode supporter 322 is disposed above the other portion P'. A distance between the peripheral portion P and the first lamp electrode supporter 321 is smaller than a distance between the other portion P' and the first lamp electrode supporter 321. Thus, the peripheral portion P and the other portion P' are connected in tiers. According to the second embodiment of the present invention, the second lamp electrode supporter 322 has a step shape 329. Alternatively, the first lamp electrode supporter 321 may have the step shape 329.

As such, the distance between the second point B and the third point C is smaller than the distance between the second point B and the fourth point D due to the step shape 329. For example, the distance between the second point B and the third point C may be 2 mm, and the distance between the second point B and the fourth point D may be 3 mm. Therefore, the lamp electrode 311 may not fall out from the lamp socket 320.

Additionally, methods of manufacturing the step shape 329 are simple. Thus, manufacturing efficiency may be enhanced.

Figure 10:
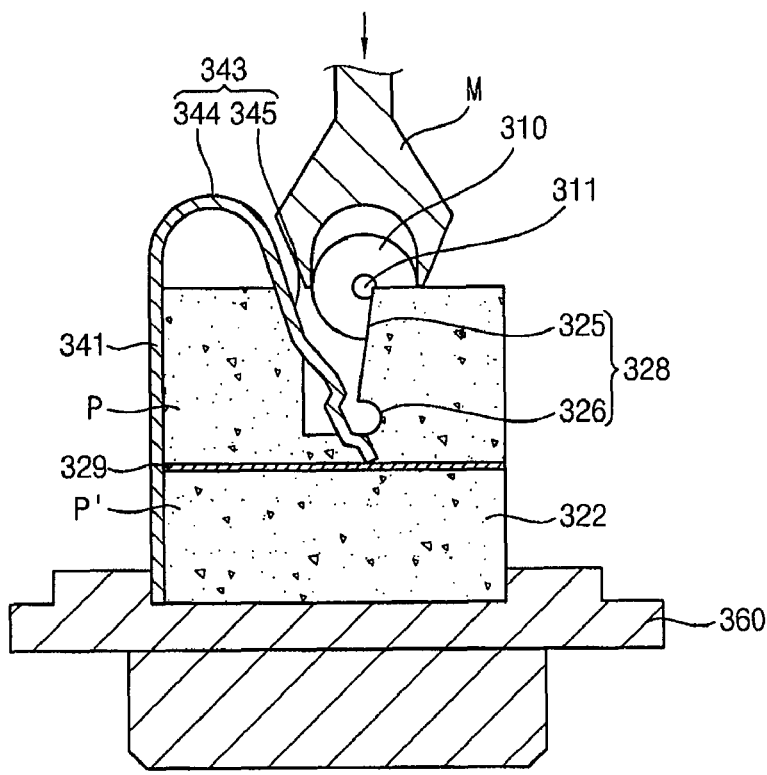
FIG. 10 is a cross-sectional view illustrating a method of assembling the lamp into the lamp socket of FIG. 9 according to one or more embodiments of the present invention.

FIG. 10 is a cross-sectional view illustrating a method of assembling the lamp into the lamp socket of FIG. 9 according to one or more embodiments of the present invention. In FIG. 10, the method of assembling the lamp 310 to the lamp socket is substantially the same as the method illustrated in FIG. 8, except that a peripheral portion P corresponding to the second lamp electrode supporter 322 is connected to the other portion P' of the second lamp electrode supporter 322 in tiers. Thus, corresponding reference numbers are used for corresponding elements and identical descriptions are omitted.

Referring to FIGS. 9 and 10, the distance between the second point B and the third point C may be 2 mm, and the distance between the second point B and the fourth point D may be 3 mm. Therefore, a distance between the first and second lamp electrode supporters 321 and 322 is sufficiently smaller than the length of the lamp electrode 311 due to the step shape 329. Thus, the lamp electrode 311 may not fall out from the lamp socket 320 when the lamp electrode 311 is inserted into and contacts the lamp socket 320.

Third Embodiment

Figure 11:
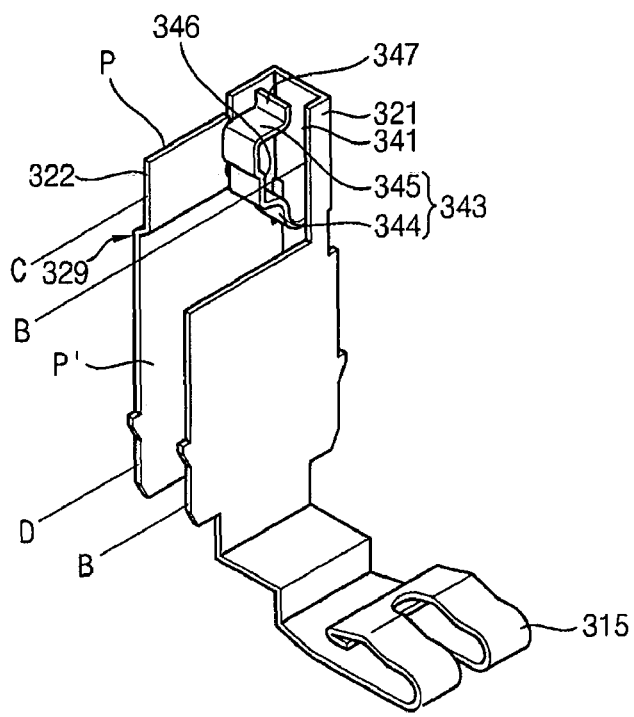
FIG. 11 is a perspective view illustrating a lamp socket according to a third embodiment of the present invention.

FIG. 11 is a perspective view illustrating a lamp socket according to a third embodiment of the present invention. In FIG. 11, the lamp socket is substantially the same as the lamp socket in FIG. 4, except that a fixing end 344 of an elastic guide part 343 is extended from a lower portion of a connecting part 341 in an upper side direction, and also that a peripheral portion P corresponding to the second lamp electrode supporter 322 is connected to the other portion P' of the second lamp electrode supporter 322 in tiers. Thus, corresponding reference numbers are used for corresponding elements and identical descriptions are omitted.

Referring to FIG. 11, the elastic guide part 343 includes a free end 345 for supporting the lamp electrode 311 when the lamp electrode 311 contacts the first and second lamp electrode fixing holes 327 and 328, and a fixing end 344 extending from a lower portion of the connecting part 341 in an upper side direction to be connected to the free end 345. The free end 345 may further include a grip part 346 enveloping the lamp electrode 311 to contact the lamp electrode 311.

The lamp electrode 311 is supported by the grip part 346 when the lamp electrode 311 is inserted into the first and second lamp electrode fixing holes 327 and 328. An end 347 of the free end 345 is used to make a space for receiving the lamp electrode 311 when the lamp electrode 311 is inserted into the first and second lamp electrode fixing holes 327 and 328. Therefore, the elastic guide part 343 may move toward the connecting part 341 by using the end 347 of the free end 345.

The peripheral portion P corresponding to the second lamp electrode supporter 322 is disposed above the other portion P'. A distance between the peripheral portion P and the first lamp electrode supporter 321 is smaller than a distance between the other portion P' and the first lamp electrode supporter 321. Thus, the peripheral portion P and the other portion P' are connected in tiers. According to the third embodiment of the present invention, the second lamp electrode supporter 322 has a step shape 329. Alternatively, the first lamp electrode supporter 321 may have the step shape 329.

As such, the distance between the second point B and the third point C is smaller than the distance between the second point B and the fourth point D due to the step shape 329. For example, the distance between the second point B and the third point C may be 2 mm, and the distance between the second point B and the fourth point D may be 3 mm. Therefore, the lamp electrode 311 may not fall out from the lamp socket 320.

Additionally, the elastic guide part 343 is disposed between the first and second lamp electrode supporters 321 and 322, and is therefore not disposed over the first and second lamp electrode supporters 321 and 322, as was the case in the first and second embodiments of the present invention. Therefore, a curvature of the elastic guide part 343 is less likely to be changed by external impacts.

According to the third embodiment of the present invention, the second lamp electrode supporter 322 includes the step shape 329. However, the second lamp electrode supporter 322 may include the concave groove 323 of the lamp socket 320 according to the first embodiment of the present invention.

Figure 12:
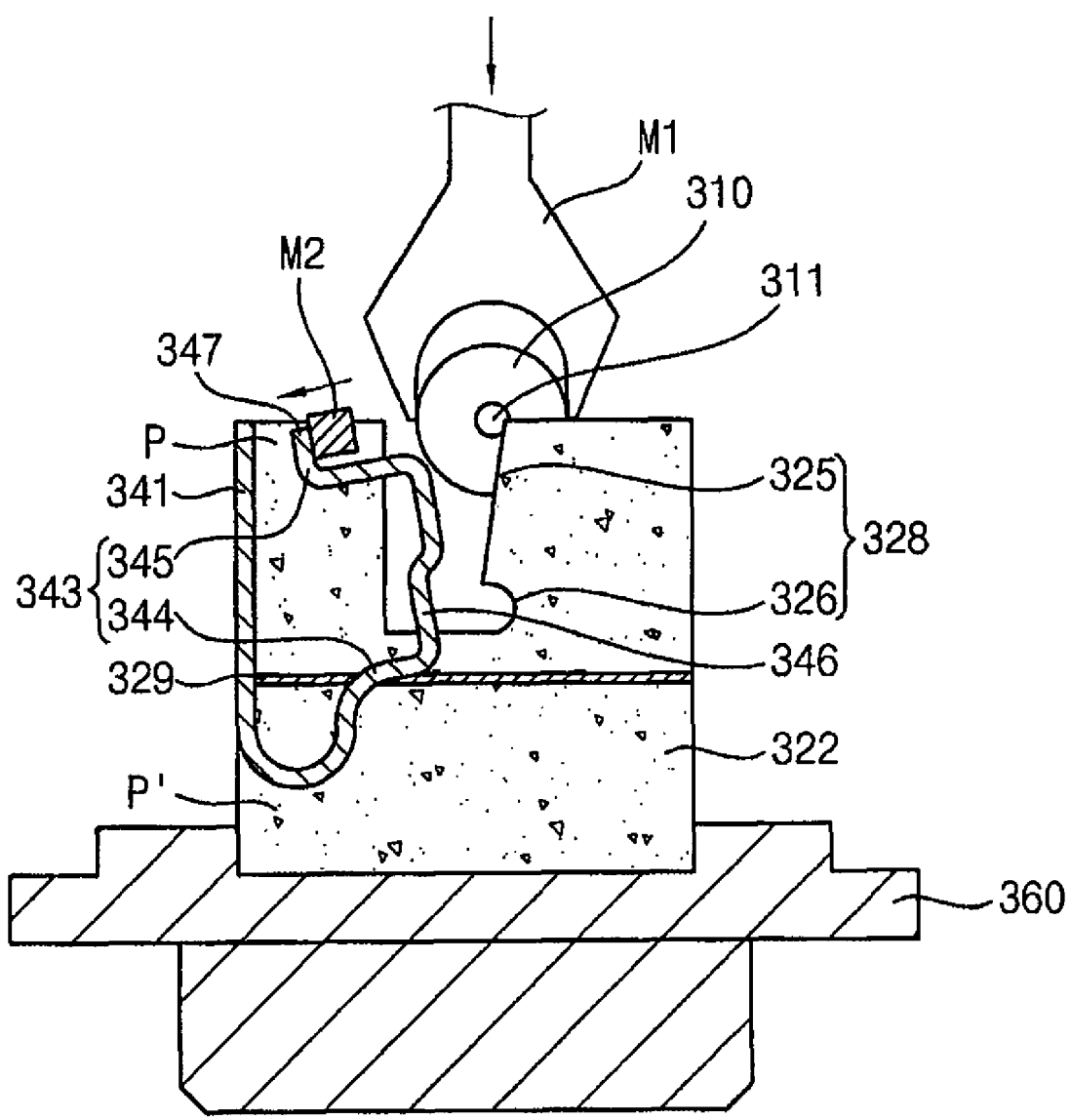
FIG. 12 is a cross-sectional view illustrating a method of assembling the lamp into the lamp socket of FIG. 11 according to one or more embodiments of the present invention.

FIG. 12 is a cross-sectional view illustrating a method of assembling the lamp into the lamp socket of FIG. 11 according to one or more embodiments of the present invention. In FIG. 12, the method of assembling the lamp 310 to the lamp socket is substantially the same as the method illustrated in FIG. 8, except that the fixing end 344 of an elastic guide part 343 is extended from the lower portion of the connecting part 341 in an upper side direction. Thus, the free end 345 moves separately from the lamp 310. As before, corresponding reference numbers are used for corresponding elements and identical descriptions are omitted.

Referring to FIGS. 11 and 12, a first automatic machine M1 moves the lamp 310 to a designated location of the lamp socket 320. A second automatic machine M2 presses the end 347 of the free end 345 of the elastic guide part 343 so that the lamp electrode 311 is inserted into the first and second lamp electrode fixing holes 327 and 328. Therefore, the elastic guide part 343 is elastically transformed. Here, the lamp electrode 311 is guided toward the second terminal 322b of the second lamp electrode supporter 322 through the second insertion guide part 325 and the lamp electrode 311 is inserted into the second supporting groove 326 when the elastic guide part 343 is pressed.

The lamp electrode 311 is supported by and makes contact with the first and second lamp electrode fixing holes 327 and 328. Here, the lamp electrode 311 may closely adhere to the first and second lamp electrode fixing holes 327 and 328 due to the elastic guide part 343 exerting elastic force against the lamp electrode 311.

Here, the lamp electrode 311 may not fall out from the lamp socket 320 when the lamp electrode 311 is inserted into and contacts the lamp socket 320 because the peripheral portion P corresponding to the second lamp electrode supporter 322 is connected to the other portion P' of the second lamp electrode supporter 322 in tiers.

According to one or more embodiments of the present invention, a lamp electrode is inserted into and contacts a first lamp electrode supporter and a second lamp electrode supporter. Thus, the lamp electrode may not fall out from the first and second lamp electrode supporters when a lamp and a lamp socket are assembled and affixed to each other. Therefore, the manufacturing costs of a backlight assembly may be reduced, and productivity may be enhanced. Additionally, stabilization of the assembly may be ensured when the lamp and the lamp socket are assembled with each other.

The foregoing embodiments are illustrative of the present invention and are not to be construed as limiting thereof. Although one or more embodiments of the present invention have been described, those skilled in the art will readily appreciate that many modifications in form and detail to the embodiments are possible without materially departing from the spirit and scope of the present invention. Accordingly, all such modifications are intended to be included within the scope of the present invention as defined in the claims.

What is claimed is:

1. A lamp socket comprising:
an inverter connector;
a first lamp electrode supporter comprising a first terminal having a first lamp electrode fixing hole through which a lamp electrode is inserted, and a second terminal being connected to the inverter connector;
a second lamp electrode supporter being disposed opposite to the first lamp electrode supporter, the second lamp electrode supporter comprising:
a second lamp electrode fixing hole through which the lamp electrode inserted, and
a peripheral portion corresponding to the second lamp electrode fixing hole, the peripheral portion extending toward the first lamp electrode supporter;
a connecting part connecting between the first lamp electrode supporter and the second lamp electrode supporter; and
an elastic guide part being extended from the connecting part to a spacing between the first lamp electrode supporter and the second lamp electrode supporter, the elastic guide part being elastically transformed when the lamp electrode is inserted into the first lamp electrode supporter and the second lamp electrode supporter, so that the elastic guide part supports the lamp electrode to the first lamp electrode fixing hole and the second lamp electrode fixing hole.

2. The lamp socket of claim 1, wherein a concave groove is formed in the peripheral portion corresponding to the second lamp electrode supporter toward the first lamp electrode supporter, and the second lamp electrode fixing hole is formed through a bottom surface of the concave groove.

3. The lamp socket of claim 2, wherein the elastic guide part comprises:
a free end adapted to support the lamp electrode when the lamp electrode contacts the first lamp electrode fixing hole and the second lamp electrode fixing hole; and
a fixing end extended from an upper portion of the connecting part toward a lower side direction to be connected to the free end.

4. The lamp socket of claim 3, wherein the free end comprises a grip part enveloping the lamp electrode to contact the lamp electrode.

5. The lamp socket of claim 2, wherein the elastic guide part comprises:
a free end adapted to support the lamp electrode when the lamp electrode contacts the first lamp electrode fixing hole and the second lamp electrode fixing hole; and
a fixing end extended from a lower portion of the connecting part toward an upper side direction to be connected to the free end.

6. The lamp socket of claim 5, wherein the free end comprises a grip part enveloping the lamp electrode to contact the lamp electrode.

7. The lamp socket of claim 1, wherein the peripheral portion of the second lamp electrode supporter is disposed on an upper portion of another portion of the second lamp electrode supporter, and wherein a distance between the peripheral portion and the first lamp electrode supporter is smaller than a distance between the another portion and the first lamp electrode supporter so that the peripheral portion and the another portion are connected in a stepped shape.

8. The lamp socket of claim 1, wherein the first lamp electrode fixing hole comprises an insertion guide part having a width which is gradually reduced from the first terminal to the second terminal of the second lamp electrode supporter, and a supporting groove formed to correspond to the shape of the lamp electrode.

9. The lamp socket of claim 1, wherein the second lamp electrode fixing hole comprises an insertion guide part having a width which is gradually reduced from the first terminal to the second terminal of the second lamp electrode supporter, and a supporting groove formed to correspond to the shape of the lamp electrode.

10. A backlight assembly comprising:
   a bottom chassis comprising a bottom plate having a socket hole formed through an edge thereof;
   a lamp being disposed on the bottom plate to comprise a lamp tube and a lamp electrode disposed at each end of the lamp tube; and
   a lamp socket comprising:
      an inverter connector exposed toward a rear surface of the bottom plate through the socket hole,
      a first lamp electrode supporter comprising a first terminal having a first lamp electrode fixing hole through which the lamp electrode is inserted, and a second terminal being connected to the inverter connector,
      a second lamp electrode supporter being disposed opposite to the first lamp electrode supporter, the second lamp electrode supporter comprising a second lamp electrode fixing hole through which the lamp electrode is inserted, and a peripheral portion in a second plane, the peripheral portion corresponding to the second lamp electrode fixing hole, the peripheral portion extending toward the first lamp electrode supporter,
      a connecting part connecting between the first lamp electrode supporter and the second lamp electrode supporter, and
      an elastic guide part being extended from the connecting part to a spacing between the first lamp electrode supporter and the second lamp electrode supporter, the elastic guide part being elastically transformed when the lamp electrode is inserted into the first lamp electrode supporter and the second lamp electrode supporter, so that the elastic guide part supports the lamp electrode to the first lamp electrode fixing hole and the second lamp electrode fixing hole.

11. The backlight assembly of claim 10, further comprising an inverter disposed on the rear surface of the bottom plate, wherein the inverter comprises a contact port electrically connected to the inverter connector.

12. The backlight assembly of claim 10, further comprising a socket housing receiving the inverter connector, the first lamp electrode supporter and the second lamp electrode supporter, wherein the bottom chassis receives the socket housing.

13. The backlight assembly of claim 10, wherein a concave groove is formed toward the first lamp electrode supporter on the peripheral portion corresponding to the second lamp electrode supporter, and the second lamp electrode fixing hole is formed through a bottom surface of the concave groove.

14. The backlight assembly of claim 13, wherein the elastic guide part comprises:
   a free end adapted to support the lamp electrode when the lamp electrode contacts the first lamp electrode fixing hole and the second lamp electrode fixing hole; and
   a fixing end extended from an upper portion of the connecting part in a lower side direction to be connected to the free end.

15. The backlight assembly of claim 13, wherein the elastic guide part comprises:
   a free end adapted to support the lamp electrode when the lamp electrode contacts the first lamp electrode fixing hole and the second lamp electrode fixing hole; and
   a fixing end extended from a lower portion of the connecting part in an upper side direction to be connected to the free end.

16. The backlight assembly of claim 10, wherein the peripheral portion of the second lamp electrode supporter is disposed on an upper portion of another of the second lamp electrode supporter in tiers so that a distance between the peripheral portion and the first lamp electrode supporter is smaller than a distance between the other portion and the first lamp electrode supporter.

17. A method of assembling a lamp, the method comprising:
   preparing a lamp having a lamp electrode formed thereon and a lamp socket, the lamp socket comprising:
      an inverter connector connected to an inverter,
      a first lamp electrode supporter being connected to the inverter connector, the first lamp electrode supporter having a first lamp electrode fixing hole formed therethrough,
      a second lamp electrode supporter having a second lamp electrode fixing hole formed therethrough, a peripheral portion corresponding to the second lamp electrode fixing hole, the peripheral portion extending toward the first lamp electrode supporter,
      a connecting part connecting between the first lamp electrode supporter and second lamp electrode supporter, and
      an elastic guide part supporting the lamp electrode; and
   inserting the lamp electrode into the first lamp electrode fixing hole and the second lamp electrode fixing hole by pressing the elastic guide part so as to support the lamp electrode when the lamp electrode contacts the first lamp electrode fixing hole and the second lamp electrode fixing hole.

18. The method of claim 17, further comprising:
   inserting the lamp electrode into a grip part being disposed in the elastic guide part and enveloping the lamp electrode to support the lamp electrode when the lamp electrode contacts the first lamp electrode fixing hole and the second lamp electrode fixing hole.

* * * * *